US008983077B2

(12) United States Patent
Molinari

(10) Patent No.: US 8,983,077 B2
(45) Date of Patent: Mar. 17, 2015

(54) MEDIA STORAGE, MEDIA READER AND METHOD FOR READING CONTENTS OF THE MEDIA STORAGE IN THE MEDIA READER

(71) Applicant: STMicroelectronics S.R.L., Agrate Brianza (IT)

(72) Inventor: Ubaldo Molinari, Naples (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 88 days.

(21) Appl. No.: 13/783,692

(22) Filed: Mar. 4, 2013

(65) Prior Publication Data

US 2013/0236020 A1   Sep. 12, 2013

(30) Foreign Application Priority Data

Mar. 8, 2012   (IT) .............. MI2012A0369

(51) Int. Cl.
G06F 21/10 (2013.01)
G11B 20/00 (2006.01)

(52) U.S. Cl.
CPC .......... *G06F 21/10* (2013.01); *G11B 20/00275* (2013.01); *G11B 20/00507* (2013.01); *G11B 20/00688* (2013.01); *G11B 20/00086* (2013.01); *G11B 2220/2537* (2013.01); *G11B 2220/657* (2013.01)
USPC ........................................ 380/287

(58) Field of Classification Search
USPC .......................................... 380/287
See application file for complete search history.

(56) References Cited

U.S. PATENT DOCUMENTS

| 2003/0217271 A1 | 11/2003 | Calder |
| 2005/0052985 A1* | 3/2005 | Senshu et al. ............. 369/273 |
| 2009/0080296 A1 | 3/2009 | Dokai et al. |
| 2009/0138726 A1 | 5/2009 | Brautigam et al. |

FOREIGN PATENT DOCUMENTS

| EP | 0996124 A1 | 4/2000 |
| WO | 2007065059 A2 | 6/2007 |

OTHER PUBLICATIONS

Akkermans et al., "Chip in Disc for Optical Storage," International Symposium on Optical Memory and Optical Data Storage (IEEE), Jul. 7, 2002, pp. 3-5.

* cited by examiner

*Primary Examiner* — Tu Nguyen
(74) *Attorney, Agent, or Firm* — Allen, Dyer, Doppelt, Milbrath & Gilchrist, P.A.

(57) ABSTRACT

A media storage device may store content adapted to be inserted in a media reader for reading the content. The content may be encrypted, and the media storage may include a smart object physically attached to the media storage and arranged to be read by a smart object reader of the media reader. The smart object may include security information for decrypting the content in the smart object reader.

24 Claims, 5 Drawing Sheets

MEDIA STORAGE, MEDIA READER AND METHOD FOR READING CONTENTS OF THE MEDIA STORAGE IN THE MEDIA READER

FIELD OF THE DISCLOSURE

The present disclosure relates to a media storage for storing content and to be inserted in a media reader for reading or playing content, more particularly, to a media storage where the contents are encrypted.

BACKGROUND

Media storage, such as a compact disc (CD), a digital video disc (DVD) or a Blue-ray disc stores media data, for example, movie, audio, data or other data in digital format. The media data is readable or playable with a media reader. The media reader may comprise a CD player, a DVD player, or a Blue-ray disc player adapted to receive the media storage and, for example, including an electric motor for actuating the media storage for reading.

Data in digital format may be easily copied from one media storage to another, without a degradation of its content. This copying may be in violation of the copyright of a proprietor of the data. FIG. 1 shows a media storage device, and a media reader or media player. The media storage 100 can be loaded in the media player 110, and the media player 110 receives and decodes the media data or content from the media storage 100.

Several techniques have been implemented for trying to prevent copying of the content or its decryption. For example, some producers of music CDs have implemented a method to disable the copying of the data contained in the media storage by signing the audio tracks with an encryption key stored in the CD. The data contained is signed or encrypted by the key in the CD. However, a hacker may find where the encryption key is stored in the media storage and extract the key for easily decrypting the content.

SUMMARY

The present disclosure provides an approach to this problem with a media storage device storing encrypted content that cannot be used for retrieving information for its decryption, even if such content is entirely copied and inspected in another device.

The approach of the present disclosure is to store the information necessary to decrypt the encrypted content of the media storage in a separate device, so that such information cannot be copied together with the content. The separate device may be attached to the media storage, and may not be readable from a reading head of a media reader adapted to play or read the content of the media storage. The information may be retrievable by a special purpose device of the media reader.

One aspect is directed to a media storage device storing content and to be inserted in a media reader for reading the content. The content may be encrypted, and the media storage device may comprise a smart object physically attached on the media storage and arranged to be read by a smart object reader of the media reader. The smart object may comprise security information for decrypting the content in the smart object reader. Advantageously, the content does not include the security information, this being stored in the smart object, and thus a copy of the content from the media storage to another device cannot include such security information.

Additionally, the smart object is embedded in a layer covering a surface of the media storage and is substantially coplanar with the layer to avoid mechanical interference in the media reader. The layer may comprise a printed layer. Advantageously, the layer may be separately manufactured from the media storage and subsequently attached to a surface of the storage. The printed layer may hide the smart object.

In another embodiment, the smart object may be attached with glue on the surface of the media storage. The attachment may avoid a decoupling of the smart object from the media storage. For example, the electronic components of the smart object may be damaged when it is detached from the media storage due to the kind of glue used or to the material of the printed layer.

The media storage may be electrically disconnected from the smart object. Both the media storage and the smart object may be electrically passive. Advantageously, the security information in the smart object may be read only through a respective smart object reader, and the security information may then be used to decrypt the content when the smart card reader communicates the same to the reading head of the media player.

In one embodiment, the media storage may comprise a CD, DVD or Blue-ray disc, and the smart object may be attached on a rounded surface of the media storage, such surface being opposite to a burning or storage surface. Advantageously, according to this embodiment, a reading head of the media reader and the smart object reader may be contemporaneously operative on counter posed sides of the media storage. Moreover, this arrangement of the smart card object may allow compliance and backwards compatibility with media storage devices already on the market and with media readers.

The smart object may be attached near a center of the surface having a lower linear speed when the media storage is played. In another embodiment, the smart object may be attached in a peripheral portion of the media storage.

In another aspect, the smart object may comprise means for contactless communication with the smart object reader or a contactless communications module/transceiver. When the media storage is moved for playing, the contactless communications module may be electrically activated by the smart object reader.

Advantageously, according to this aspect, the communication between the smart object reader and the smart object may occur when the media storage is actuated by the media reader for reading/playing, and thus, the security information required to read may be retrieved dynamically while moving. Such information may be associated to different portions of the media storage; thus, a first content in the media storage to be read may be encrypted with a first predetermined algorithm and a first encryption key which are stored in the smart object and transmitted to the smart object reader when the media reader receives a request of reading the first content. Other content in the media storage may be encrypted with another algorithm and encryption key, different from the first algorithm and the first encryption key, which are stored in the smart object and transmitted to the smart object reader when the media player receives a request of reading the other content. The security information may be transmitted from the smart object reader to the media reader without stopping the movement of the media storage in the media reader.

In another aspect, a plurality of sections may be defined in the media storage, where one or more protected sections of the sections are associated to corresponding security information. In an embodiment, a group of protected section may also be associated to a single security information value. The smart object reader may retrieve security information on such different protected sections while the media reader is moving the media storage.

The security information may comprise means for decrypting the encrypting content, for example, an encryption key and/or an encryption algorithm and/or key parameters for the encryption algorithm. The smart object may comprise an integrated circuit (IC) card or a smart card complying with the ISO 7816 specification.

In another embodiment, the media storage may comprise a plurality of sections associated to the security information. The smart object may be programmed to receive from the smart object reader a request of the security information on a protected section to be read or played and to return the security information to the smart object reader, for decrypting the content of the protected section.

In another embodiment, a producer of the content to be stored in the media storage and a producer of the media reader may agree on the encryption and decryption keys and encryption algorithms. Then, the content producer encrypts its contents using the encryption algorithm and keys and stores the encrypted content in the media storage. Such keys and algorithms are not stored in the media storage but in the smart object, as security information. For example, the information may be stored in a memory location of the smart object, which is communicated to the media reader. The media reader producer programs the smart object reader to access the security information that was previously agreed upon with the content producer, for example, entering the memory location and reading the security information for decrypting the content.

Another aspect is directed to a media reader for reading content stored in a media storage adapted to be inserted in the media reader. A smart object reader may be integrated in the media reader and adapted to read security information from a smart object physically attached to the media storage, the security information being used from the smart object reader for decrypting the content. Additionally, the smart object reader may be programmed to request the security information from the smart object on at least one protected section of the media storage and to receive from the smart object the security information for decrypting the content of the protected section.

Another aspect is directed to a method for protecting content stored in media storage to be inserted in a media reader. The method may comprise sending a query from a smart object reader integrated in the media reader to a smart object attached to the media storage and arranged to be read from the media reader, for retrieving security information for decrypting the content in the smart object reader. The method may also include identifying a protected section of the media storage storing the content, and requesting the security information for decrypting the content of the protected section Further advantages and features of the method, the media reader, and the media storage according to the present disclosure will be apparent from the description given here below only for exemplificative purpose and without limiting the scope of protection of the present disclosure.

DETAILED DESCRIPTION

Figure 1:
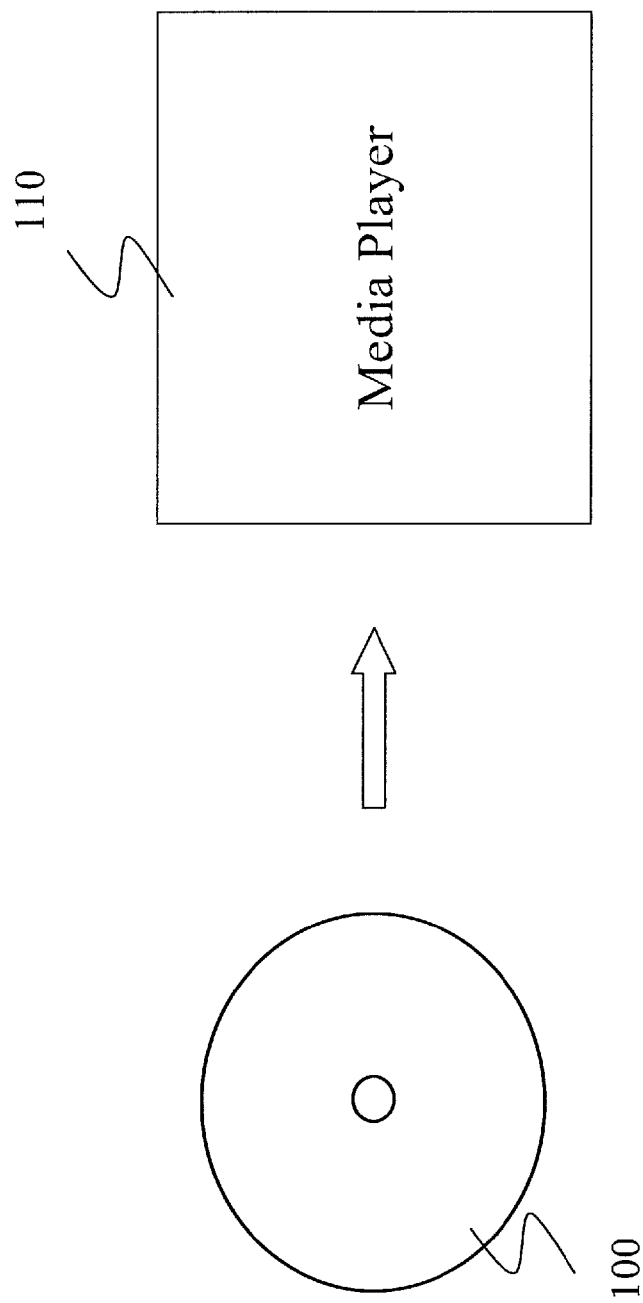
FIG. 1 is a schematic diagram of a media storage device and a media reader, according to the prior art.
Figure 2A:
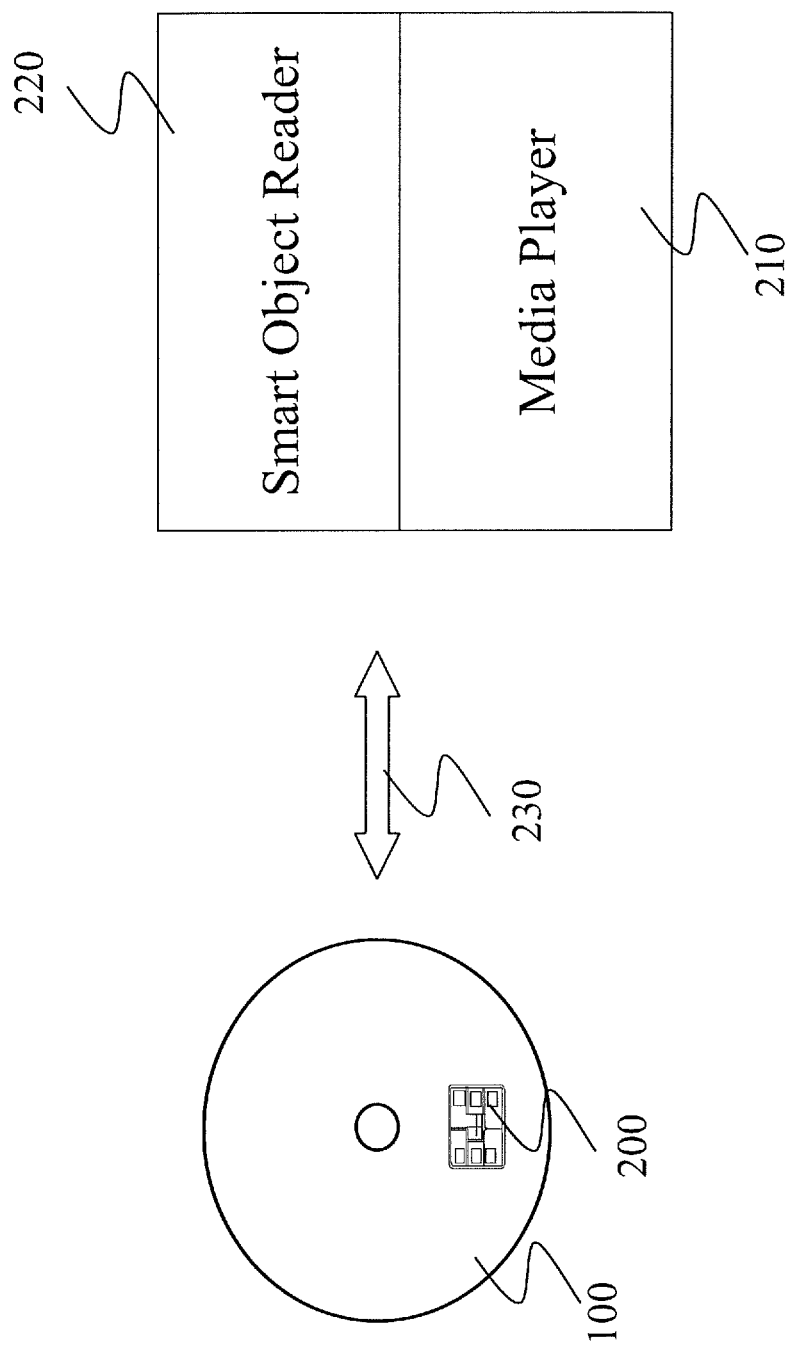
FIG. 2A is a schematic diagram of a media storage device and a media reader, according to the present disclosure.

With reference to FIG. 2A, a media storage device for storing content, such as movies, audios or other data in predetermined formats, for example, a CD, a DVD or a Blue-ray, is schematically represented and indicated with 100. The data is encrypted for protection from unauthorized copying or reading in a media reader or media player adapted to receive the CD, DVD or Blue-ray in a respective seat/tray and to actuate it for playing.

Figure 2B:
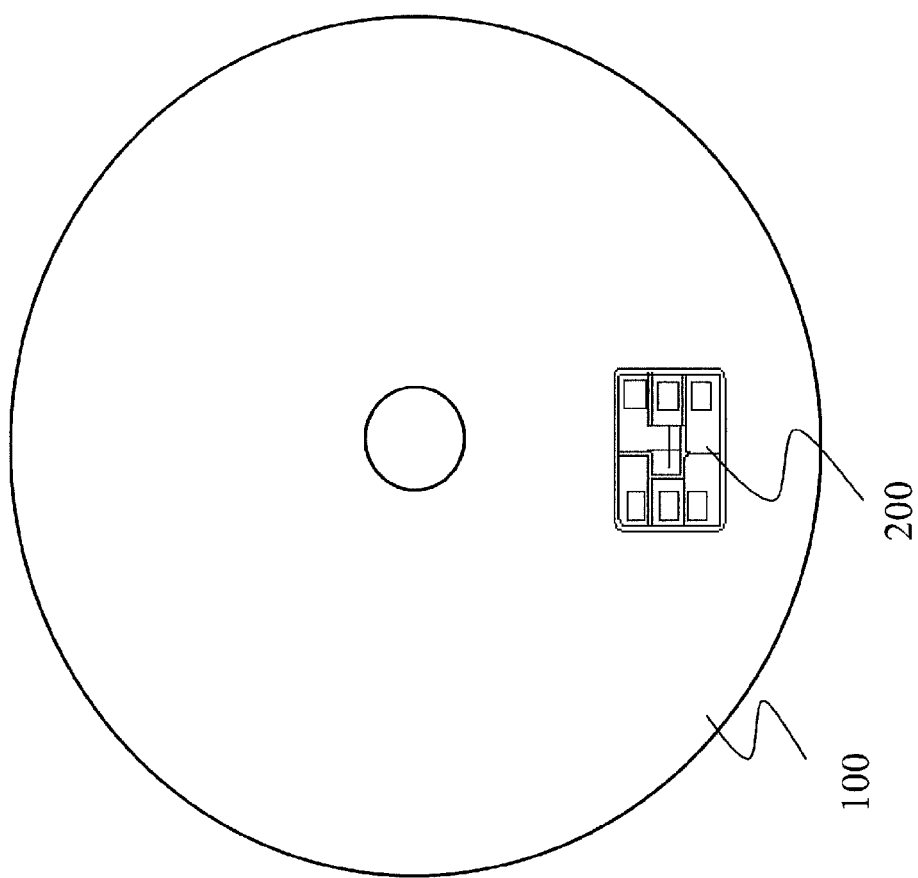
FIG. 2B is an enlarged schematic diagram of the media storage device of FIG. 2A.

According to the present disclosure, the media storage device comprises a smart object including information for decrypting the content, and the media reader comprises a smart object reader for reading the information in the smart object. With reference to FIG. 2B, the media storage device 100 comprises a smart object 200 physically attached to the media storage device 100, for example, on a side counter posed with respect to a burned or storage side of the media storage device, the latter side being coupled to a reading head of the media reader.

The smart object is a separate hardware device with respect to the media storage device, i.e. a device having its memory and microprocessor, and it is physically attached with glue or is embedded in a cover under a layer of the side of the media storage device, for example, a printed layer. More particularly, a surface of the smart object is substantially coplanar with a surface of the layer covering the media storage device and does not mechanically interfere in the seat of the media reader when the media storage device is inserted in the seat and played.

In an embodiment, the smart object is attached near a center of the media device, for example, a rounded media support with a central hole intended to be inserted on a hinge of the media reader. More particularly, the smart object 200 is arranged to be read from the smart object reader 220 when the media storage device is inserted in the media reader, for example, counter posed to the reading head of the media reader with respect to the media storage device. In other words, a first side of the media storage device comprises tracks and sectors where the content is stored in digital encrypted format, and the smart object is attached on the second side of the media storage device. The reading head of the media reader is faced to the first side, and the smart object reader is faced to the second side of the media storage device.

In an embodiment, the smart object comprises an IC card or smart card complying with the ISO 7816 specification, and the smart object reader is an IC card reader for reading the IC card. The smart object 200 provides security information to the smart object reader 220, for decrypting the content which, as mentioned above, is stored in encrypted format in the media storage device.

In an embodiment, a communication between the smart object and the corresponding smart object reader is contactless. According to this embodiment, the smart object reader reads the smart object also when the media storage device is moved for playing by the media reader. More particularly, the smart object reader 220 and the media reader may be manufactured in two separate hardware devices, connected together, or as a single hardware device integrating both the function of communicating with the smart object and reading the content of the media storage device.

In another embodiment, the smart card reader contacts the smart object for reading the security information, and thus, the media storage device is stopped by the reader for reading the security information. According to this embodiment, the media reader detects a request for reading an encrypted portion or sector of the media storage device and stops it for reading the security information when such request is detected. In such embodiment, the smart object is preferably attached to a peripheral portion of the media storage device. The security information comprises means or a module for decrypting the encrypted content, for example, an encryption key, an encryption algorithm or key parameters for the algorithm.

Figure 3:
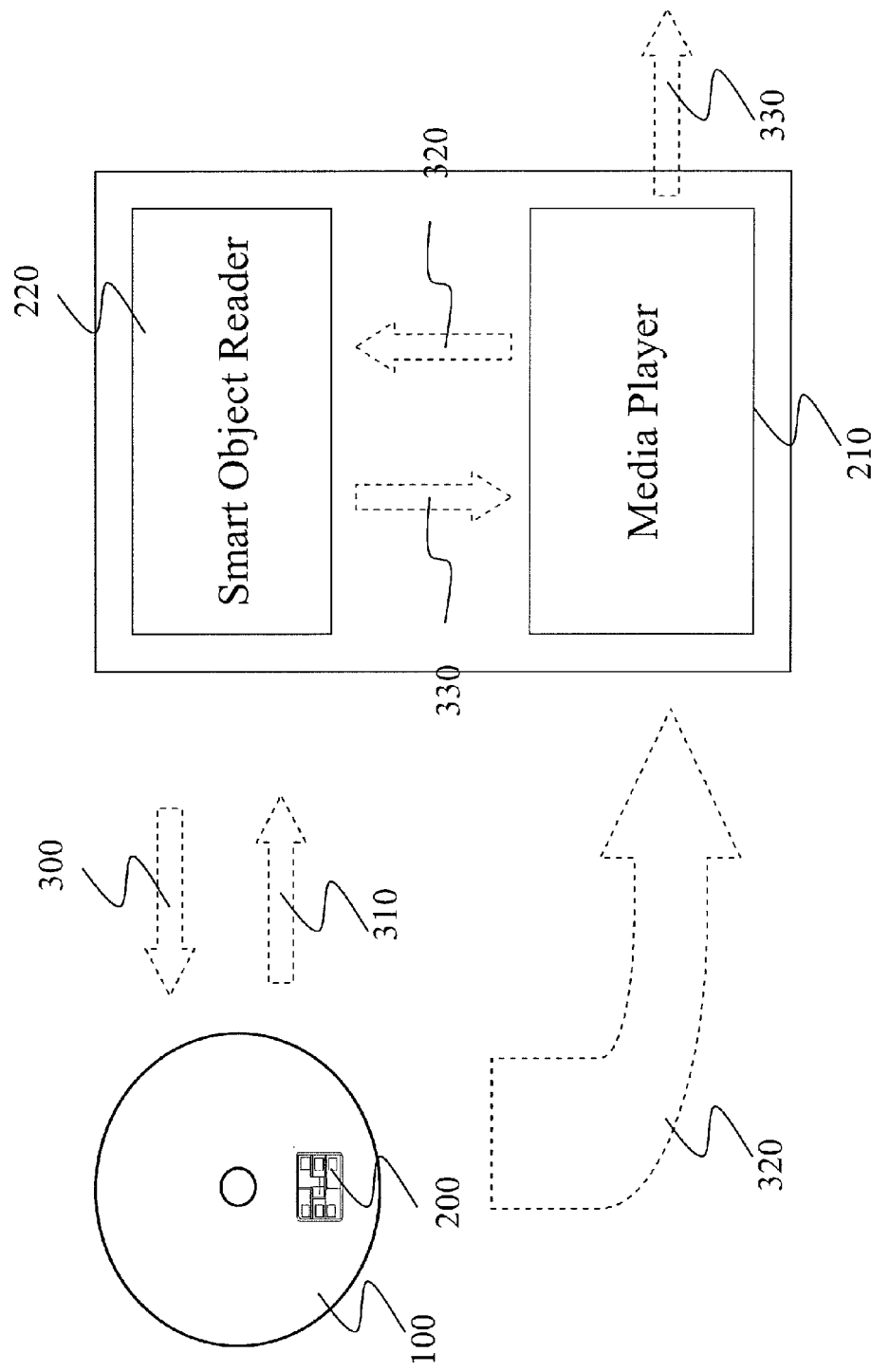
FIG. 3 is a schematic diagram of a data exchange between the media storage device including a smart object and the media player including a smart object reader, according to the present disclosure.

FIG. 3 schematically represents in a flowchart of a data exchange between the media storage device, smart object, media reader, and smart object reader according to the present disclosure. The media storage device 100 is inserted and loaded in the media reader 210 and comprises the physically attached smart object 200. The smart object 200 exchanges data 300, 310 with the smart object reader 220, and the encrypted content 320 of the media storage device is provided as input to the media reader 210. More particularly, the smart object 200 transmits to the smart object reader 220 security information 310 used for decrypting the content in the media reader, i.e. the encrypted media data 320. The security information is requested from the smart object reader 220 for a protected section on which a media reader 210 reads. The request is in the form of a query 300 including sector identification.

Figure 4:
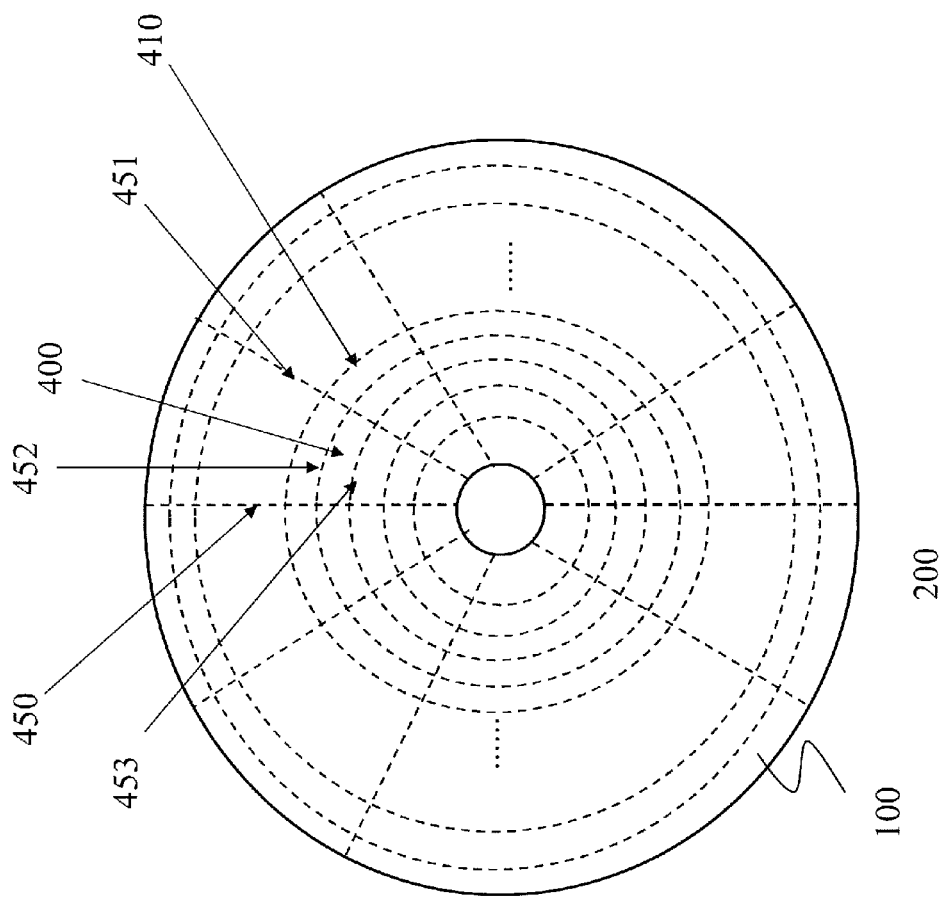
FIG. 4 is a schematic diagram of sections of a media storage device, according to the present disclosure.

With reference to FIG. 4, the media storage device, for example, an optical media storage device, includes sections which are defined by a number of circle, each circle being distinguished by a different diameter, and a division line from a center toward a circumference of the circle. For example, a first sector 400 is surrounded by two division lines 450, 451, and two circles 452, 453. A second sector 410 may be defined in a similar way.

In other words, according to the present disclosure, the media storage device 100 comprises a plurality of sections 400, 410 associated to corresponding security information values. The smart object reader sends a query 300 for the security information to the smart object 200, including section identification, and the smart object 200 returns the security information 310 of the section. The security information 310 may include the encryption/decryption key for the corresponding section. In an embodiment, predetermined security information is used to specify that a corresponding section of the media player is not protected. In other words, a communication between the smart object and the smart object reader is always required to read content, even if the corresponding section is not protected, but the security information transmitted for such section, from the smart object to the smart object reader, does not actually comprise any algorithm of keys for decryption. The smart object reader 220 extracts the encryption/decryption key 310 and transmits the key 330 to the media player 210. The media player 210 uses the key for decrypting the encrypted media data 320. Advantageously, the key may be different for each different data format, for example, audio, video, other data formats. The media player 210 requests the encryption key from the smart object reader, sending a signal 320 including the section identification.

In an embodiment, the security information 310 comprises an algorithm for encryption/decryption of the content in a protected section. The smart object reader 220 extracts the encryption/decryption key and algorithm 310, and transmits the encryption key and algorithm 330 to the media player 210, the latter using the algorithm and the key for decrypting the encrypted media data 320, i.e. the protected content. In this case, both the key and the algorithm can be different for each different data format, i.e. for audio, video, or auxiliary data.

According to an embodiment, a plurality of sections are grouped together and associated to a same key and/or algorithm. For example, all the sections within a perimeter of a same distance from a center are grouped. Advantageously, according to this embodiment, the query for security information can be requested less frequently, since the same security information may be used to decrypt multiple sections.

Advantageously, the security information is stored in the smart object 200, which is a device physically separated from the media storage device, and thus the security information cannot be copied with the content stored in the media storage device. A smart object reader 220 with access rights to the smart object is requested to read the security information and to play the content. Moreover, storing different algorithms and decryption/encryption keys for different sections of the storage media, protection may be further improved.

That which is claimed is:

1. A media storage device to be inserted in a media reader having an associated smart object reader, the media storage device comprising:
    a storage medium comprising a plurality of encrypted sections and unencrypted sections and configured to store encrypted content in the encrypted sections and unencrypted content in the unencrypted sections, at least one of the encrypted sections having encrypted content based upon an encryption format different from other encrypted sections; and
    a smart object attached to said storage medium and configured to be read by the smart object reader, said smart object comprising
        security information for decrypting the encrypted content in the encrypted sections, and
        respective locations for reading the unencrypted content in the unencrypted sections.

2. The media storage device according to claim 1 wherein said storage medium comprises a surface layer; and wherein said smart object is embedded in the surface layer and is substantially coplanar with the surface layer.

3. The media storage device according to claim 2 wherein the surface layer comprises a printed paper layer.

4. The media storage device according to claim 1 wherein said smart object is electrically insulated from said storage medium.

5. The media storage device according to claim 1 wherein said storage medium comprises one of a compact disc (CD), a digital video disc (DVD), and a Blue-ray disc; wherein said storage medium has a data storage surface, and a round surface adjacent the data storage surface; and wherein said smart object is attached to the round surface.

6. The media storage device according to claim 5 wherein said smart object is attached adjacent a center of the round surface.

7. The media storage device according to claim 1 wherein said smart object comprises a contactless transceiver configured to communicate with the smart object reader when the media reader is accessing said storage medium, said contactless transceiver configured to be activated by the smart object reader.

8. The media storage device according to claim 1 wherein the security information comprises an encryption key and algorithm configured to decrypt and encrypt the encrypted content.

9. The media storage device according to claim 1 wherein said smart object comprises an integrated circuit (IC) device complying with an ISO 7816 specification.

10. The media storage device according to claim 1 wherein a group of the encrypted sections are associated with a same value security information.

11. An electronic device for reading a media storage device comprising a storage medium comprising a plurality of encrypted sections and unencrypted sections storing encrypted content in the encrypted sections and unencrypted content in the unencrypted sections, at least one of the encrypted sections having encrypted content based upon an encryption format different from other encrypted sections, and a smart object attached to the storage medium, the electronic device comprising:
a media reader configured to receive the media storage device; and
a smart object reader cooperating with said media reader and configured to read the encrypted content of the smart object, the smart object comprising
security information for decrypting the encrypted content in the encrypted sections, and
respective locations for reading the unencrypted content in the unencrypted sections.

12. The electronic device according to claim 11 wherein said smart object reader is configured to request the security information from the smart object on at least one encrypted section of the storage medium, and to receive from the smart object the security information for decrypting the encrypted content of the at least one encrypted section.

13. The electronic device according to claim 11 wherein said media reader further comprises a reading head configured to contemporaneously operate with said smart object reader on counter opposed sides of the storage medium.

14. The electronic device according to claim 11 wherein the storage medium comprises a surface layer; and wherein the smart object is embedded in the surface layer and is substantially coplanar with the surface layer.

15. The electronic device according to claim 14 wherein the surface layer comprises a printed paper layer.

16. The electronic device according to claim 11 wherein the smart object is electrically insulated from the storage medium.

17. The electronic device according to claim 11 wherein the storage medium comprises one of a compact disc (CD), a digital video disc (DVD), and a Blue-ray disc; wherein the storage medium has a data storage surface, and a round surface adjacent to the data storage surface; and wherein the smart object is attached to the round surface.

18. The electronic device according to claim 17 wherein the smart object is attached adjacent a center of the round surface.

19. A method for decrypting encrypted content stored in a storage medium of a media storage device to be inserted in a media reader, the media reader having an associated smart object reader, the method comprising:
sending a query from the smart object reader to a smart object attached to the storage medium, the storage medium comprising a plurality of encrypted sections and unencrypted sections to store the encrypted content in the encrypted sections and unencrypted content in the unencrypted sections, at least one of the encrypted sections having encrypted content based upon an encryption format different from other encrypted sections; and
reading the smart object with the smart object reader to retrieve
security information stored in the smart object for decrypting the encrypted content in the encrypted sections, and
respective locations for reading the unencrypted content in the unencrypted sections.

20. The method according to the claim 19 further comprising identifying an encrypted section of the storage medium storing the encrypted content, and requesting the security information for decrypting the encrypted content.

21. The method according to claim 19 wherein the storage medium comprises a surface layer; and wherein the smart object is embedded in the surface layer and is substantially coplanar with the surface layer.

22. The method according to claim 21 wherein the surface layer comprises a printed paper layer.

23. The method according to claim 19 wherein the smart object is electrically insulated from the storage medium.

24. The method according to claim 19 wherein the storage medium comprises one of a compact disc (CD), a digital video disc (DVD), and a Blue-ray disc; wherein the storage medium has a data storage surface, and a round surface adjacent to the data storage surface; and wherein the smart object is attached to the round surface.

* * * * *